United States Patent [19]

Nakano

[11] Patent Number: 5,835,379
[45] Date of Patent: Nov. 10, 1998

[54] APPARATUS AND METHOD FOR ANALYZING A PROCESS OF FLUID FLOW, AN APPARATUS AND METHOD FOR ANALYZING AN INJECTION MOLDING PROCESS, AN INJECTION MOLDED PRODUCT, AND A PRODUCTION METHOD OF THE INJECTION MOLDED PRODUCT

[75] Inventor: Ryo Nakano, Ohtsu, Japan

[73] Assignee: Toray Industries, Inc., Tokyo, Japan

[21] Appl. No.: 508,899

[22] Filed: Jul. 28, 1995

[30] Foreign Application Priority Data

Aug. 1, 1994 [JP] Japan ................................. 6-180094

[51] Int. Cl.[6] ........................... G06F 17/50; B29C 45/76
[52] U.S. Cl. ............................... 364/475.02; 364/475.03; 364/475.05; 364/475.09; 364/149; 364/578; 364/510; 364/551.01; 264/40.3; 264/40.5; 264/40.1; 264/328.1; 264/328.12; 264/328.13; 264/572; 264/500; 425/135; 425/145; 425/149
[58] Field of Search ......................... 364/475.02–475.09, 364/473.01, 578, 510, 505, 551.01, 149, 508, 807, 810; 264/40.1, 40.5, 239, 328.1, 328.12, 328.13, 500, 572, 40.3

[56] References Cited

U.S. PATENT DOCUMENTS

| 4,387,655 | 6/1983 | Chaiken ................................. 110/347 |
| 4,504,920 | 3/1985 | Mickowski ............................. 364/550 |
| 4,534,003 | 8/1985 | Manzione ............................... 364/476 |
| 4,868,751 | 9/1989 | Dogru et al. ........................... 364/422 |
| 4,989,166 | 1/1991 | Akasaka et al. ....................... 364/578 |

(List continued on next page.)

FOREIGN PATENT DOCUMENTS

| 0 525 198 A1 | 2/1993 | European Pat. Off. . |
| 3743351 A1 | 5/1988 | Germany . |
| 3830571 A1 | 4/1989 | Germany . |
| 3839907 A1 | 6/1989 | Germany . |

6-122068 6/1994 Japan .

OTHER PUBLICATIONS

Patent Abstracts of Japan, vol. 17, No. 123 (M–1380), 15 Mar. 1993 and JP–A–04 305424 (Dainippon Printing Co. Ltd), abstract only.
Patent Abstracts of Japan, vol. 17, No. 172 (M–1392), 2 Apr. 1993 and JP–A–04 331125 (Sekisui Chem Co., Ltd) abstract only.
Patent Abstracts of Japan, vol. 95, No. 5, and JP–A–07 125034 (Toray Ind. Inc.), 16 May 1995, abstract only.
Revue Generale Des Caoutchoucs et Plastiques, vol. 71, No. 734:37–38, 40, 42, Sep. 1, 1994, XP 000465010 Terrisse J., "Les Atouts de la Buse Rheometrique EAPH".
European Search Report dated Dec. 6, 1995.

Primary Examiner—Emanuel Todd Voeltz
Assistant Examiner—Tuan Q. Dam
Attorney, Agent, or Firm—Morrison & Foerster LLP

[57] ABSTRACT

The present invention presents a fluid flow process analyzing apparatus and method, an injection molding process analyzing apparatus and method, an injection molded product and an injection molded product producing method, in which a three-dimensional model divided into a plurality of small elements to present a cavity where fluid flows is used for analyzing a process of fluid flow such as injection molding process in a practical computing time. The fluid flow process analyzing apparatus and method of the present invention comprises; constructing a three-dimensional model divided into a plurality of small elements to represent a cavity where fluid flows, determining the flow conductance κ as a small value when the small element concerned is located close to the cavity wall surface and as a large value when the small element is located far away, and computing the pressures, pressure transitions or flow velocities at the respective small elements based on the flow conductances determined. The injection molded product producing method of the present invention determines the injection molding conditions such as product shape, mold design and material selection using the fluid flow process analyzing apparatus or method described above.

23 Claims, 7 Drawing Sheets

U.S. PATENT DOCUMENTS

| | | | |
|---|---|---|---|
| 5,031,108 | 7/1991 | Fujita et al. | 364/475.02 |
| 5,031,127 | 7/1991 | Fujita et al. | 364/475.02 |
| 5,035,598 | 7/1991 | Fujita et al. | 425/144 |
| 5,097,431 | 3/1992 | Harada et al. | 364/578 |
| 5,097,432 | 3/1992 | Harada et al. | 364/578 |
| 5,146,086 | 9/1992 | De et al. | 250/253 |
| 5,350,547 | 9/1994 | Yamaguchi et al. | 264/40.12 |
| 5,377,119 | 12/1994 | Backer et al. | 364/476 |
| 5,549,857 | 8/1996 | Kamiguchi et al. | 264/40.1 |
| 5,572,434 | 11/1996 | Wang et al. | 364/475.02 |

G : GATE
PRESSURE TRANSITION = 0.2[MPa/sec]

G : GATE

G : GATE
PRESSURE TRANSITION = 0.2[MPa/sec]

G : GATE

APPARATUS AND METHOD FOR ANALYZING A PROCESS OF FLUID FLOW, AN APPARATUS AND METHOD FOR ANALYZING AN INJECTION MOLDING PROCESS, AN INJECTION MOLDED PRODUCT, AND A PRODUCTION METHOD OF THE INJECTION MOLDED PRODUCT

An apparatus and method for analyzing a process of fluid flow, an apparatus and method for analyzing an injection molding process, an injection molded product, and a production method of the injection molded product

Technical Field

The present invention relates to an apparatus and method for analyzing a process of fluid flow by finding the pressures or pressure transitions or flow velocities of the fluid in the process of fluid flow, and an apparatus and method for analyzing an injection molding process by applying said apparatus or method, and a method for producing an injection molded product by determining the molding conditions using said method for analyzing an injection molding process, and an injection molded product produced by said method.

BACKGROUND OF THE INVENTION

In general, methods for analyzing processes of fluid flow such as injection molding processes by reproducing the injection molding processes, etc. using computer simulation are widely practically used. The following description is mainly concerned with the methods for analyzing injection molding processes as typical methods for analyzing processes of fluid flow.

These injection molding process analyzing methods contribute to achieving higher quality, higher efficiencies and lower costs in the product development of injection molded products, etc. For example, these methods are disclosed in Japanese Patent Laid-Open Nos. 91-224712, 92-152120, 92-305424, 92-331125, etc. These injection molding process analyzing methods use two-dimensional models for finding the pressures, temperatures, shear stresses, etc. at respective portions.

In these conventional injection molding process analyzing methods, since a two-dimensional model is used as the model of an injection molded product, the respective portions of the injection molded product are divided into many two-dimensional small elements such as triangles and rectangles, and the pressures, temperatures, shear stresses, etc. at the respective small elements are found by a numerical analysis technique using a computer.

In the conventional injection molding process analyzing methods, when the shape of an injection molded product can be approximated by combining two-dimensional figures, for example, when the thickness of the injection molded product is thin for the entire size of the injection molded product, the results obtained by analysis can be highly accurate.

However, when the molded product is more than 5 mm in thickness or generally small such as a connector, the conventional analysis methods do not allow highly accurate analysis since the three-dimensional flow such as flow in the thickness direction becomes very influential. Moreover, even when the molded product is thin, the conventional methods of using plane elements give little useful information in the accurate analysis of local flow condition as in a step shape portion or corner shape portion of the product.

For example, when the molded product is T-shaped, the conventional injection molding process analyzing methods cannot accurately express the form of the intersection since a two-dimensional model which is divided into a plurality of small two-dimensional rectangular elements 1 as shown in FIG. 17 is used.

So, it can be considered to analyze using a three-dimensional model which is divided into a plurality of small three-dimensional hexahedral elements 2 as shown in FIG. 3 by a general method of computational fluid analysis such as the finite element method or finite difference method. In this case, the model to be analyzed is divided into three-dimensional small elements such as hexahedrons, triangular pyramids and triangular poles. If such a model is used for analysis by a general method of computational fluid analysis, an actual shape can be accurately modeled, to allow analysis at higher accuracy.

However, the application of such a general method of three-dimensional analysis requires a large volume of computation, to take a very long computing time unpractically. The reasons are as follows. The flow in an injection molding process is a moving boundary problem in which the filled region expands with the lapse of time. Furthermore, in general, the material to be injection-molded is a non-Newtonian fluid, the viscosity of which for having a flow property changes depending on the temperature and shear rate, and the temperature which decides the viscosity also changes every moment with the lapse of time. Thus, the three-dimensional analysis of complicated flow requires enormous computing time and memory requirement. So, it has been practically difficult to achieve higher efficiency or cost reduction by such a simulation instead of the trial manufacture by an actual machine.

Therefore, when an injection molded product is produced based on the molding conditions of the injection molded product found by any conventional injection molding process analyzing method and apparatus as mentioned above, either or both of the problems occur, that the injection molded product cannot be produced under preferable conditions because of unsatisfactory analysis accuracy and that the productivity is very low.

The injection molded product obtained under this manufacturing process has problems in view of strength, etc. since it cannot be produced under optimum conditions.

SUMMARY OF THE INVENTION

In view of the above problems, the first object of the present invention is to present an apparatus and method for analyzing a process of fluid flow which accurately reproduces the shape of the flow channel of the fluid using a three-dimensional model and performs precise analysis within a practical computing time.

The second object of the present invention is to present an apparatus and method for analyzing an injection molding process which accurately reproduces the shape of the molded product using a three-dimensional model and performs precise analysis within a practical computing time.

The third object of the present invention is to present a method for efficiently producing an injection molded product of high quality by determining such molding conditions as product shape, mold design and material selection by using said injection molding process analyzing apparatus.

The fourth object of the present invention is to present an injection molded product produced under optimum conditions using said injection molded product producing method.

The present invention presents an apparatus for analyzing a process of fluid flow comprising; a three-dimensional model constructing means for constructing a three-dimensional model divided into a plurality of small elements to represent at least a part of a cavity where fluid flows, a flow conductance determining means for determining the flow conductance κ of the fluid as a small value when the small element concerned is located close to the cavity wall surface and determining the flow conductance κ of the fluid as a large value when the small element is located far away, and a pressure computing means for finding the pressures of the fluid at said respective small elements based on said flow conductances κ.

The present invention also presents an apparatus for analyzing a process of fluid flow comprising; a three-dimensional model constructing means for constructing a three-dimensional model divided into a plurality of small elements to represent at least a part of a cavity where fluid flows, a flow conductance determining means for determining the flow conductance κ of the fluid as a small value when the small element concerned is located close to the cavity wall surface and determining the flow conductance κ of the fluid as a large value when the small element is located far away, and a pressure transition computing means for finding the pressure transitions of the fluid at said respective small elements based on said flow conductances κ.

The present invention also presents an apparatus for analyzing a process of fluid flow comprising; a three-dimensional model constructing means for constructing a three-dimensional model divided into a plurality of small elements to represent at least a part of a cavity where fluid flows, a flow conductance determining means for determining the flow conductance κ of the fluid as a small value when the small element concerned is located close to the cavity wall surface and determining the flow conductance κ of the fluid as a large value when the small element is located far away, and a flow velocity computing means for finding the flow velocities of the fluid at said respective small elements based on said flow conductances κ.

The present invention also presents a method for analyzing a process of fluid flow comprising; constructing a three-dimensional model divided into a plurality of small elements to represent at least a part of a cavity where fluid flows, determining the flow conductances κ of the fluid at the respective small elements, finding the pressures of said fluid at said respective small elements based on said flow conductances κ determined, and analyzing the flow process of said fluid by said pressures found.

The present invention also presents a method for analyzing a process of fluid flow comprising; constructing a three-dimensional model divided into a plurality of small elements to represent at least a part of a cavity where fluid flows, determining the flow conductances κ of the fluid at the respective small elements, finding the pressure transitions of said fluid at said respective small elements based on said flow conductances κ determined, and analyzing the flow process of said fluid by said pressure transitions found.

The present invention also presents a method for analyzing a process of fluid flow comprising; constructing a three-dimensional model divided into a plurality of small elements to represent at least a part of a cavity where fluid flows, determining the flow conductances κ of the fluid at the respective small elements, finding the flow velocities of said fluid at said respective small elements based on said flow conductances κ determined, and analyzing the flow process of said fluid by said flow velocities found.

In a preferred embodiment of said method for analyzing a process of fluid flow of the present invention, the flow conductance κ at each of said small elements is determined by a function $F(R, \eta)$ which increases according to the increase of the minimum distance R between the small element and the cavity wall surface, and decreases according to the increase of the viscosity η of said fluid.

In another preferred embodiment of said method for analyzing a process of fluid flow of the present invention, the flow conductance κ at each of said small elements is determined by solving the following equation;

$$\frac{\partial^2 \kappa}{\partial x^2} + \frac{\partial^2 \kappa}{\partial y^2} + \frac{\partial^2 \kappa}{\partial z^2} = -\frac{1}{\eta}$$

(where η is the viscosity of said fluid; and x, y and z represent the position of said small element).

The present invention also presents an apparatus for analyzing an injection molding process comprising; a three-dimensional model constructing means for constructing a three-dimensional model divided into a plurality of small elements to represent at least a part of an injection molded product, a flow conductance determining means for determining the flow conductance κ of the material to be injection-molded as a small value when the small element concerned is located close to the mold surface and determining the flow conductance κ of the material to be injection-molded as a large value when the small element is located far away, and a pressure computing means for finding the pressures of the material to be injection-molded at said respective small elements based on said flow conductances κ.

The present invention also presents an apparatus for analyzing an injection molding process comprising; a three-dimensional model constructing means for constructing a three-dimensional model divided into a plurality of small elements to represent at least a part of an injection molded product, a flow conductance determining means for determining the flow conductance κ of the material to be injection-molded as a small value when the small element concerned is located close to the mold surface and determining the flow conductance κ of the material to be injection-molded as a large value when the small element is located far away, and a pressure transition computing means for finding the pressure transitions of the material to be injection-molded at said respective small elements based on said flow conductances κ.

The present invention also presents an apparatus for analyzing an injection molding process comprising; a three-dimensional model constructing means for constructing a three-dimensional model divided into a plurality of small elements to represent at least a part of an injection molded product, a flow conductance determining means for determining the flow conductance κ of the material to be injection-molded as a small value when the small element concerned is located close to the mold surface and determining the flow conductance κ of the material to be injection-molded as a large value when the small element is located far away, and a flow velocity computing means for finding the flow velocities of the material to be injection-molded at said respective small elements based on said flow conductances κ.

The present invention also presents a method for analyzing an injection molding process comprising; constructing a three-dimensional model divided into a plurality of small elements to represent at least a part of an injection molded product, determining the flow conductances κ of the material to be injection-molded at the respective small elements, finding the pressures of the material to be injection-molded at said respective small elements based on said flow conductances κ determined, and analyzing the injection molding process of the injection molded product, by said pressures found.

The present invention also presents a method for analyzing an injection molding process comprising; constructing a three-dimensional model divided into a plurality of small elements to represent at least a part of an injection molded product, determining the flow conductances κ of the material to be injection-molded at the respective small elements, finding the pressure transitions of the material to be injection-molded at said respective small elements based on said flow conductances κ determined, and analyzing the injection molding process of the injection molded product, by said pressure transitions found.

The present invention also presents a method for analyzing an injection molding process comprising; constructing a three-dimensional model divided into a plurality of small elements to represent at least a part of an injection molded product, determining the flow conductances κ of the material to be injection-molded at the respective small elements, finding the flow velocities of the material to be injection-molded at said respective small elements based on said flow conductances κ determined, and analyzing the injection molding process of the injection molded product, by said flow velocities found.

In a preferred embodiment of said method for analyzing an injection molding process of the present invention, the flow conductance κ at each of said small elements is determined by a function F(R, η) which increases according to the increase of the minimum distance R between the small element and the mold surface, and decreases according to the increase of the viscosity η of said material to be injection-molded.

In another preferred embodiment of said method for analyzing an injection molding process of the present invention, the flow conductance κ at each of said small elements is determined by solving the following equation;

$$\frac{\partial^2 \kappa}{\partial x^2} + \frac{\partial^2 \kappa}{\partial y^2} + \frac{\partial^2 \kappa}{\partial z^2} = -\frac{1}{\eta}$$

(where η is the viscosity of said material to be injection-molded; and x, y and z represent the position of said small element).

The present invention also presents a method for producing an injection molded product comprising; determining the molding conditions of an injection molded product, constructing a three-dimensional model divided into a plurality of small elements to represent at least a part of said injection molded product, determining the flow conductance κ of the material to be injection-molded, as a small value when the small element concerned is located close to the mold surface while determining the flow conductance κ of the material to be injection-molded, as a large value when the small element is located far away, finding the pressures of said material to be injection-molded, at the respective small elements based on the flow conductances κ determined, finally deciding molding conditions based on the distribution of the pressures thus found, and producing the injection molded product based on said finally decided molding conditions.

The present invention also presents a method for producing an injection molded product comprising; determining the molding conditions of an injection molded product, constructing a three-dimensional model divided into a plurality of small elements to represent at least a part of said injection molded product, determining the flow conductance κ of the material to be injection-molded, as a small value when the small element concerned is located close to the mold surface while determining the flow conductance κ of the material to be injection-molded, as a large value when the small element is located far away, finding the pressure transitions of said material to be injection-molded, at the respective small elements based on the flow conductances κ determined, finally deciding molding conditions based on the distribution of the pressure transitions thus found, and producing the injection molded product based on said finally decided molding conditions.

The present invention also presents a method for producing an injection molded product comprising; determining the molding conditions of an injection molded product, constructing a three-dimensional model divided into a plurality of small elements to represent. at least a part of said injection molded product, determining the flow conductance κ of the material to be injection-molded, as a small value when the small element concerned is located close to the mold surface while determining the flow conductance κ of the material to be injection-molded, as a large value when the small element is located far away, finding the distribution of flow velocities of said material to be injection-molded, at the respective small elements based on the flow conductances κ determined, finally deciding molding conditions based on the distribution of flow velocities thus found, and producing the injection molded product based on said finally decided molding conditions.

The present invention also presents a method for producing an injection molded product, in which said molding conditions include any one of the shape of said injection molded product, mold configuration, injection speed, mold temperature and injection molded material.

The present invention also presents an injection molded product produced by any one of the above production methods.

DETAILED DESCRIPTION OF THE PREFERRED EMBODIMENTS

Preferred embodiments of the injection molding process analyzing apparatus and method as an example of the apparatus and method for analyzing a process of fluid flow of the present invention are described below in detail in reference to drawings. A preferable embodiment of the injection molded product producing method is also described below.

Figure 1:
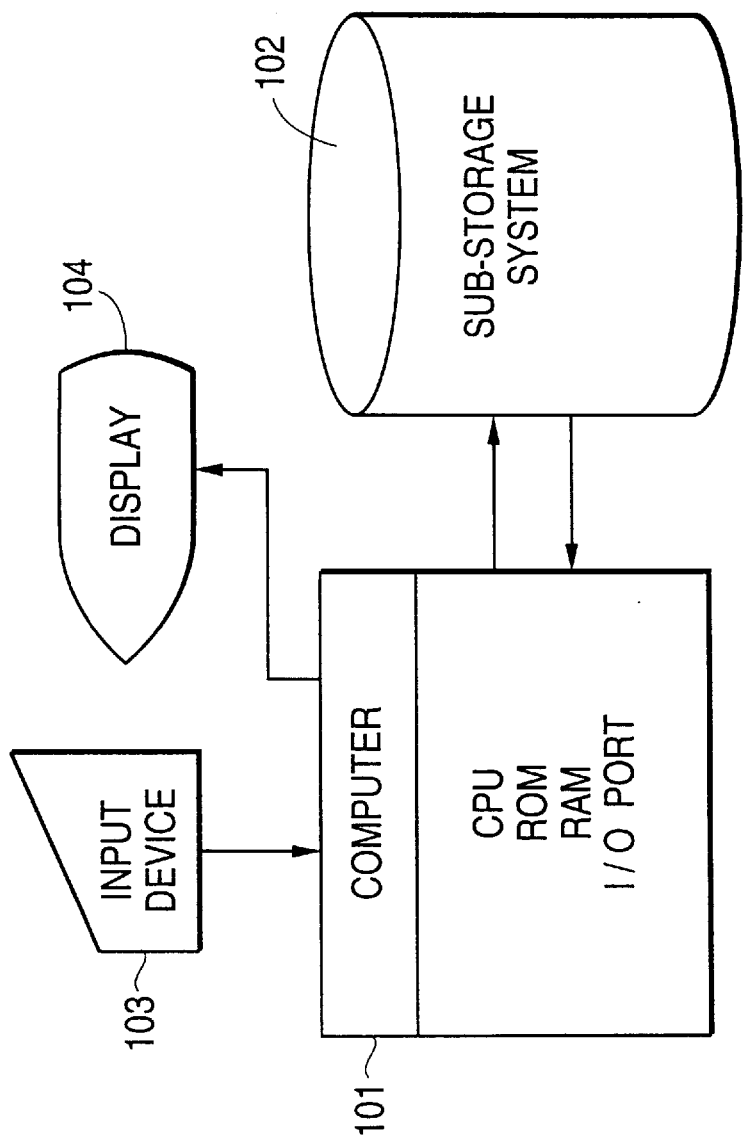
FIG. 1 is a diagram showing an example of the hardware configuration of the apparatus for analyzing a process of fluid flow (injection molding process) of the present invention.

FIG. 1 is a diagram showing an example of the hardware configuration of the injection molding process analyzing apparatus of the present invention. A computer 101 is connected with an input device 103, a display 104 and a sub-storage system 102. The input device 103 receives, for example, the data of the injection molding conditions of the injection molded product to be analyzed and of the three-dimensional model. The data are stored in the sub-storage system 102. The operator instructs the computer 101 to read the data into the RAM (random access memory) contained in it and to analyze. The results obtained by analysis are displayed, for example, by the display 104. As needed, the operator can modify the injection molding conditions and re-analyze. The analyzed results can also be outputted into a printer provided separately or stored in the sub-storage system 102. In this case, the outputted results can also be used, for example, as input data of another analyzer.

Figure 2:
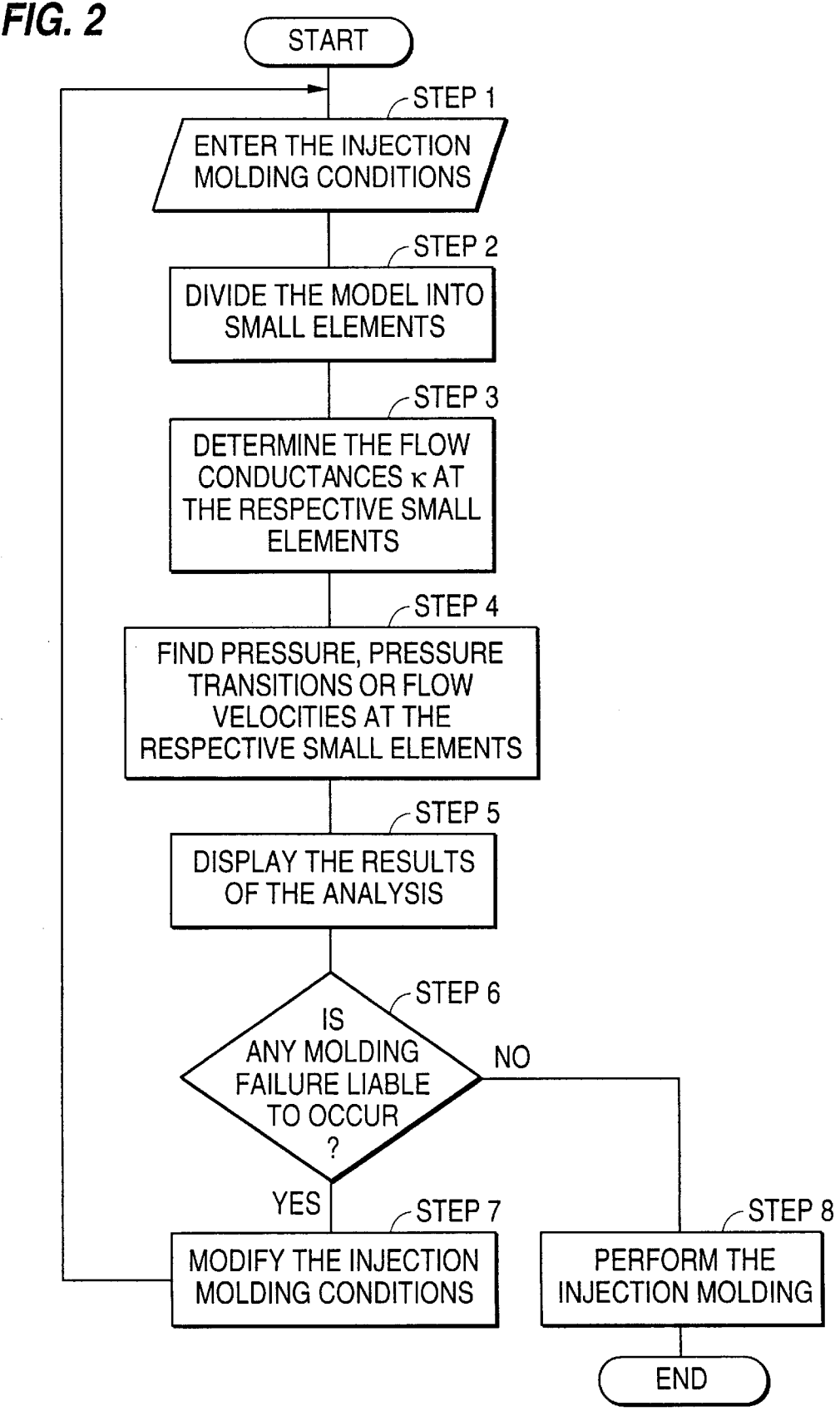
FIG. 2 is a flow chart showing an example of the procedure in the injection molding process analyzing method and the injection molded product producing method of the present invention.

FIG. 2 is a flow chart showing an example of the procedure in the injection molding process analyzing apparatus and method of the present invention and in the injection molded product producing method using said apparatus.

Figure 3:
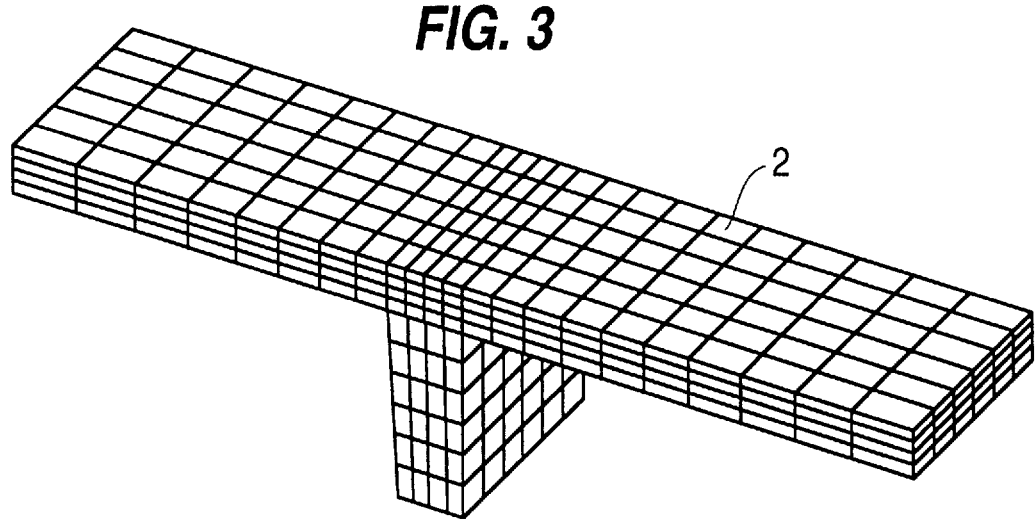
FIG. 3 is a drawing showing an example of a three-dimensional model divided into small elements used in the present invention.

In the analysis of injection molding process, at first, the injection molding conditions of the injection molded product (such as the shape of the injection molded product, mold configuration, injection speed, injection temperature, mold temperature and injection molded material) are entered (Step 1). Then, the shape is three-dimensionally divided into small elements to construct a three-dimensional model of the product, for example, as shown in FIG. 3 (Step 2). In succession, the flow conductances κ at the respective small elements are determined (Step 3). Subsequently, the pressures of the material to be injection-molded (hereinafter called "material pressures") at the respective small elements are found using the flow conductances κ at the respective small elements determined in Step 3 (Step 4). In this case, the pressure transitions at the respective small elements may also be found instead. As a further other method, the flow velocities of the material to be injection-molded at the respective small elements may also be found from the found distribution of material pressures or directly. The results thus obtained by analysis are, for example, graphically processed, to be expressed as contour lines or as a graph (Step 5). The results can also be outputted onto a printer, etc. as described above.

When an injection molded product is produced using the analyzed results of injection molded process, the pressures, pressure transitions or flow velocities obtained as above are evaluated (Step 6). This evaluation is performed, for example, by judging that a molding failure is highly liable to occur when there is any region with an abnormal pressure, pressure transition or fluid velocity. If any molding failure is predicted from the results obtained by analysis, the injection molding conditions are modified (Step 7), and analysis is carried out again from Step 1. These steps are repeated, and when the results assure a prediction that good injection molding can be achieved, the injection molding is carried out according to the injection molding conditions, to produce the intended injection molded product (Step 8).

The methods for finding the material pressures, pressure transitions and flow velocities at the respective small elements are described below in detail.

To find the material pressures in injection molding, the generally known continuity equation (1) is used. The equation expresses that the sun of the incoming flow into a given region in the fluid and the outgoing flow from the region is zero, and holds when the fluid is assumed to be incompressible. When the fluid is compressible, the right hand side does not become zero, though the following discussion similarly holds.

$$\frac{\partial U}{\partial x} + \frac{\partial V}{\partial y} + \frac{\partial W}{\partial z} = 0, \qquad (1)$$

where x, y and z are three-dimensional coordinates of space, and U, V and W are the flow velocities of the material to be injection-molded in the directions of the respective coordinate axes. This equation (1) is an equation with U, V and W as unknown variables, and in general, it is said necessary to solve a momentum equation with this equation and the shear stress derived from pressure P and flow velocity as unknown variables. So, when three-dimensional flow is handled, there are four unknown variables.

The inventors found that the computing time can be greatly reduced by using the following equations (2) for solving the equation (1), to eliminate the flow velocities U, V and W in the respective directions from the equation (1), thereby decreasing the number of unknown variables from four to one only of pressure. In this case, the computing time in the use of a three-dimensional model can be decreased to about 1/16 and the required RAM volume of the computer, to about 1/4. Thus, for the first time, the analysis of a three-dimensional injection molding process at a practical speed and accuracy can be achieved.

$$U = -\kappa \frac{\partial P}{\partial X}, V = -\kappa \frac{\partial P}{\partial Y}, W = -\kappa \frac{\partial P}{\partial Z} \qquad (2)$$

In the above equations (2), κ is a flow conductance. The equations (2) are called Darcy's flow equations, which express porous flow. That is, it is assumed that the flow velocities U, V and W in the respective directions of three-dimensional coordinate axes x, y and z are proportional to the pressure gradients, etc. in the respective directions.

Substitution of the equations (2) into the equation (1) gives the following equation (3).

$$\kappa \left( \frac{\partial^2 P}{\partial x^2} + \frac{\partial^2 P}{\partial y^2} + \frac{\partial^2 P}{\partial z^2} \right) = 0 \qquad (3)$$

The equation (3) is the same in form as a general equation expressing thermal conduction. In a thermal conduction problem, for a given region which is divided into small elements, the temperature distribution in the region can be obtained by such a numerical analysis method such as the finite element method, finite difference method or control volume method by presetting the temperature T or temperature gradient at the boundary as a boundary condition. Therefore, if the pressure P or pressure gradient of the boundary is set as a boundary condition for a given region which is divided into small elements, the equation (3) can be similarly solved by using an analysis method or analysis program for thermal conduction problems, and the pressure distribution of a material can be obtained.

For the setting of boundary condition, for example, the pressure gradient value obtained from the injection pressure values or injection flow rates is set at the material inflow portion, then the pressure gradient zero is set at the boundary in contact with the mold surface since neither inflow nor outflow occurs, atmospheric pressure being set as the pressure of the flow front portion with free surface.

Furthermore, since the material filled region increases with the lapse of time in injection molding, the pressure distribution also changes with the lapse of time. Such temporal change of pressure distribution (distribution of pressure transitions) can be obtained by solving the equation (3) again by finding the shape of the filled region varied according to the overall quantity of the newly filled material. The varied shape of the filled region can be found by the control volume method or FAN(Flow Analysis Network) method, etc. used in the conventional injection molding process analyzing methods.

The flow velocity can be simply obtained, for example, by obtaining the pressure distribution P as described above and substituting it into the equation (1).

An actual injection molded product may have a region as thin as allowing to disregard the thickness-oriented flow of the material to be injection-molded. Such a region may be analyzed two-dimensionally using a two-dimensional model and using the following equations (4) instead of the equations (2). This can further raise the overall computational speed.

$$U = -\kappa \frac{\partial P}{\partial x}, V = -\kappa \frac{\partial P}{\partial y}, \kappa = \frac{H^2}{12\eta}, \qquad (4)$$

where H is the thickness of the material flow channel, and η is the viscosity.

The method for determining the flow conductances κ in Step 3 of FIG. 2 is described below in detail.

For a portion in which the injection molding process is analyzed using a two-dimensional model, the flow conductance can be singly determined from the flow channel shape and the viscosity as shown in the equations (4), and the use of the value is preferable.

In the analysis using a three-dimensional model, κ can be preferably determined, for example, by the following method found by the inventor.

The inventor found that the flowability of the material to be injection-molded becomes higher according to the increase of distance from the mold surface and lower according to the decrease of distance. Therefore, generally it is preferable to determine the flow conductance as a small value when the small element concerned is located close to the mold surface and as a large value when far away. Therefore, the assumption that the flow conductance κ changes according to a function showing such a tendency gives a good approximation in the results of the analysis. That is, it is preferable to use the following equation (5) as the flow conductance κ in such a case.

$$\kappa = F(R, T\eta), \qquad (5)$$

where R is the minimum distance from the center of gravity of the element concerned to the mold surface or the minimum distance from the apex of the element concerned to the mold surface, and η is the viscosity.

The function F of the equation (5) increases the flow conductance κ according to the increase of distance from the mold surface, i.e., the increase of R since the effect of friction force between materials is lower, and decreases the flow conductance κ according to the increase of viscosity η since the flowability is lower. It is defined as a function to increase κ according to the increase of R and decreases η according to the increase of η, for example, like κ=aR/η+b. In this case, a is a positive proportional coefficient, and b is a coefficient showing the flow conductance at R=0, that is, at the mold surface. These constants a and b are determined, for example, by experimenting typical injection molded products, etc. The linear equation concerning R/η stated here has a feature that the computation is completed in a short time, as the simplest mode to express function F. Depending on the type of injection molded product, another equation which gives analyzed results well agreeing with the actual results of molding can also be used.

Furthermore the viscosity η depends on the temperature, shear rate, etc., and can be expressed by an approximation as shown in the equation (6). In the equation, A, B and C are coefficients peculiar to the material and can be experimentally obtained by a viscosity measuring instrument. If the approximate value of viscosity obtained by the equation (6) is substituted into the equation (5), the effect of the change of viscosity caused by the changes of shear rate and temperature can be simply incorporated into the computation of flow conductance.

$$\eta = A \times (shear\ rate)^B \times exp(C \times temperature) \qquad (6)$$

The flow conductance κ can also be obtained as described below.

The inventor found a method for obtaining the flow conductance κ by solving the differential equation shown in the equation (7), where x, y and z are the three-dimensional coordinate axes of space, and η is the viscosity.

$$\frac{\partial^2 \kappa}{\partial x^2} + \frac{\partial^2 \kappa}{\partial y^2} + \frac{\partial^2 \kappa}{\partial z^2} = -\frac{1}{\eta} \qquad (7)$$

The inventor found that the equation (7) can be obtained by substituting the first equation of the equations (2) into the equation (8) expressing the force balance in a flow field dominated by viscous force, to eliminate the flow velocity U, and neglecting the 2nd order derivative terms concerning the x, y and z of pressure P. The neglect of the 2nd order derivative terms allows κ to be obtained by the following simple method.

$$\eta \left( \frac{\partial^2 U}{\partial x^2} + \frac{\partial^2 U}{\partial y^2} + \frac{\partial^2 U}{\partial z^2} \right) = \frac{\partial P}{\partial x} \qquad (8)$$

The equation (7) is the same in form as a general equation expressing thermal conduction. It is known that in a thermal conduction problem, if the temperature T or temperature gradient of the boundary is preset as a boundary condition for a region with a given shape, the temperature distribution in the region can be obtained by such a numerical analysis method as the finite element method, boundary element method, finite difference method or control volume method, etc. Therefore, if the equation (7) is solved by setting a boundary condition that κ at the mold surface as the boundary is zero, a distribution of κ smaller at a position closer to the mold surface and larger at a position far away can be obtained using any analysis method or analysis program for solving thermal conduction problems. The boundary condition of κ=0 corresponds to the assumption that the speed at the mold surface is zero, as can be seen from the equation (1). The slip at the mold surface can also be considered if a small value such as κ=0.01 mm$^2$/(Pa·sec) is used instead of zero.

If the approximate value of the viscosity by the equation (6) is substituted into the equation (7), the effect of the change of the viscosity caused by the changes of shear rate and temperature can also be simply incorporated into the computation of flow conductance.

This method allows the flow conductance to be obtained accurately for a given shape though a longer computing time is taken for the necessity of solving the thermal conduction equation, compared to the method of determining the flow conductance κ using the above equation (5). Furthermore, since the equation (7) is derived based on the equation (8) which is an equation to express the force balance in a flow field dominated by the viscous force as described above, the value obtained is more highly physically consistent than that obtained by the method of using the equation (5). Therefore, always highly accurate results of analysis can be obtained irrespective of the shape of the injection molded product, the model divided into small elements, etc.

Figure 4:
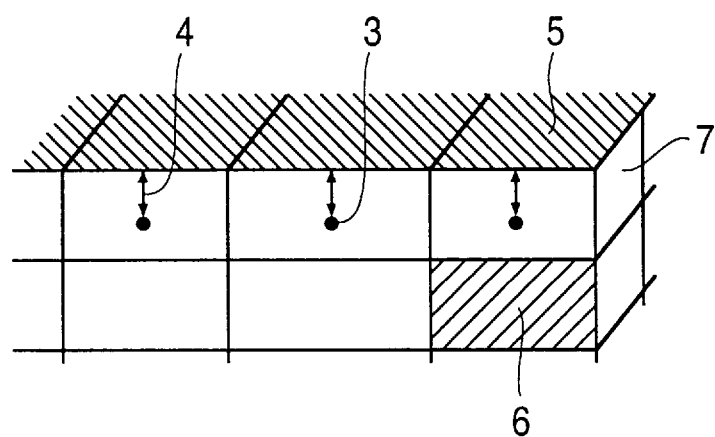
FIG. 4 is a conceptual view showing an example of a method for determining the flow conductances used in the present invention.
Figure 5:
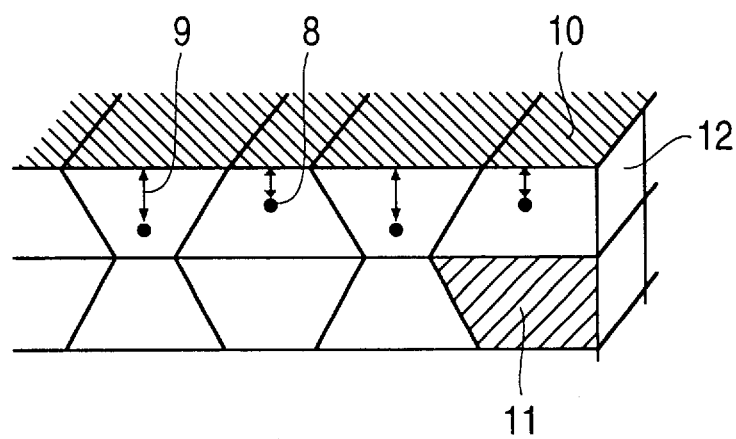
FIG. 5 is a conceptual view showing an example of a method for determining the flow conductances used in the present invention.

For example, let us consider cases where small elements with sectional shapes as shown in FIGS. 4 and 5 are used. In FIGS. 4 and 5, each of the small elements 7, 12 has a center of gravity of the element 3, 8, respectively, a minimum distance 4, 9, respectively, from the center of gravity of the element to the mold surface, a contact portion 5, 10, respectively, between a product divided into the small elements, and a section 6, 1 1, respectively, of the element. The flow conductance determining method using the equation (5) allows the flow conductances to be accurately and quickly determined when the small elements are divided regularly as shown in FIG. 4, but if the small elements are irregularly formed as shown in FIG. 5, since the centers of gravity of the adjacent elements cannot be constant in reference to the mold surface, the flow conductances obtained may be inaccurate.

In general, the division into small elements used for numerical analysis can be automatically performed by a program called a preprocessor, and especially a complicatedly shaped product with many protrusions and holes can also be easily divided. The automatic division generally makes the small elements shaped irregularly, but the method using the equation (7) can minimize the effect of the shapes of small elements and allows highly accurate analysis even if applied to a complicatedly shaped injection molded product.

In addition to the above, there are various other methods for determining the flow conductances, and especially in the case of special shapes, any method for achieving high computational accuracy and computational speed can be considered.

The following describes the method for producing an injection molded product by analyzing the injection molding process by the above mentioned method and deciding the injection molding conditions based on the analyzed results.

The distribution of material pressures, pressure transitions or the flow velocities of the material to be injection-molded in the case where an injection molded product is produced under the injection molding conditions given can be obtained as described above. In this case, the results can be used for modifying and deciding the injection molding conditions as described below.

In general, to obtain a less s trained molded product at low stresses in injection molding, the material pressures should be desirably as low as possible, and the pressure gradient should also be preferably as uniform as possible without any extremely sharp portion and without any extremely gentle portion. Also in the temporal change of pressure, the occurrence of peak pressure due to sharp pressure rise is not preferable. If such pressure criteria are applied, the acceptability of the molding state can be judged. Furthermore, it is preferable to apply criteria based on the flow velocities obtained as described above.

The molded state can also be judged based on the flow velocity gradient, shear rates and stresses, or the filling pattern, etc. These data can be simply obtained by processing the information on the pressure distribution, pressure transition distribution or flow velocity distribution obtained by the corresponding method described above. For example, the shear rate can be defined as the speed gradient among the small elements, and the shear stress can be obtained by multiplying the shear rate by the viscosity of the material, and the filling pattern in the filling region can be analyzed by sequentially deciding the region filled next in reference to the speed of the flow front.

When any failure is expected by the above judging method, a flaw-less injection molded product can be produced by correcting the mold design, product design, molding conditions or material used, according to the methods described below.

The first correction method is to correct the mold configuration, for modifying the material flow channel, etc. The mold configuration in this case means the material flow channel from the injection nozzle of the material to the product shape portion which are gererally called the spur, runner and gate. For example, if the pressure loss is judged to be too large since the flow length from the nozzle to the end of cavity is too long, the flow length can be shortened by branching the runner for allowing the material to flow through plural gates into the product shape portion.

The second correction method is to correct the shape of the injection molded product for modifying the material flow channel. For example, if the pressure gradient at the product shape portion is so large as to threaten large straining, the product can be increased in thickness to lessen the pressure gradient.

The third correction method is to modify such a molding condition as the injection speed, material temperature or mold temperature. For example, if the pressure rises heavily at the material inlet at a certain time threatening difficult molding, the pressure rise can be lowered by lowering the injection speed at that time or raising the material temperature and/or mold temperature.

The fourth correction method is to change the material to be injection-molded. For example, if the material pressure loss is so large as to threaten difficult molding, the adoption of any highly flowable material low in viscosity can lower the pressure loss.

The above correction methods can be adopted individually or as a combination. Moreover, it is preferable to use an expert system, etc. for automatically performing the above correction.

The injection molding conditions are re-examined as described above, and analysis is performed again using the above mentioned injection molding process analyzing apparatus under the conditions conjectured to give preferable injection molding results, to repeat this analysis till the injection molding conditions to obtain the optimum results can be found. If the injection molding conditions to obtain the optimum results are found, the injection molding is performed under the conditions, to produce the intended injection molded product.

The present invention can be applied, in principle, to all the shapes of injection molded products, but is especially effective for products liable to suffer the three-dimensional shape effects.

Products liable to suffer the three-dimensional shape effects are thick parts of more than 5 mm in thickness, or small parts of about 10 mm in the dimension of the largest portion even with thin thickness of about 1 to 2 mm in which the effect of flow in the thickness direction is relatively liable to occur. Furthermore, three-dimensional analysis is effective also for the local flow of a region where the flow suddenly changes in thickness direction such as a step shape portion or corner shape portion.

The injection molding process analyzing method of the present invention can also be used in combination with any of the conventional two-dimensional methods, and for a portion unaffected by three-dimensional flow, the conventional two-dimensional elements can be used to achieve higher efficiency of analysis.

In the present invention, the mold used can be a metallic mold machined by any precise machining method such as electric discharge machining of metal.

The apparatus and method for analyzing a process of fluid flow of the present invention can be preferably used for analyzing not only an injection molding process but also a general process of fluid flow. For example, the present invention is suitable for analyzing a flow process accompanying three-dimensional material flow such as the material flow in the extrusion die of extrusion molding, the flow in the screw channel of an extruder or the flow in a kneading machine.

Thus, the present invention can be applied to obtain the pressure distribution, pressure transition distribution or material flow velocity distribution during the flow in the extrusion die for round bar or flat plate extrusion molding or profile extrusion molding. Since the quality of the molded product may be lowered due to material retention and thermal degradation in a portion where the pressure gradient or flow velocity is close to zero, the extrusion molding conditions such as die shape must be determined not to generate any retaining portion. The present invention is also suitable for such applications.

The present invention can also be applied to decide the conditions of design for lessening the retaining portions in the screw of an injection molding machine or extrusion molding machine. Furthermore, the present invention can also be applied to the computation of the shear stress distribution in the screw channel of an extruder type kneading machine in a design to maximize the shear stress value.

EXAMPLES

The fluid flow process analyzing apparatus and method of the present invention are described below in detail with the injection molding process analyzing apparatus and method and the injection molded product producing method as examples in reference to the drawings. FIG. 2 is a flow chart showing the procedure in the method of the present invention.

EXAMPLE 1

Figure 6:
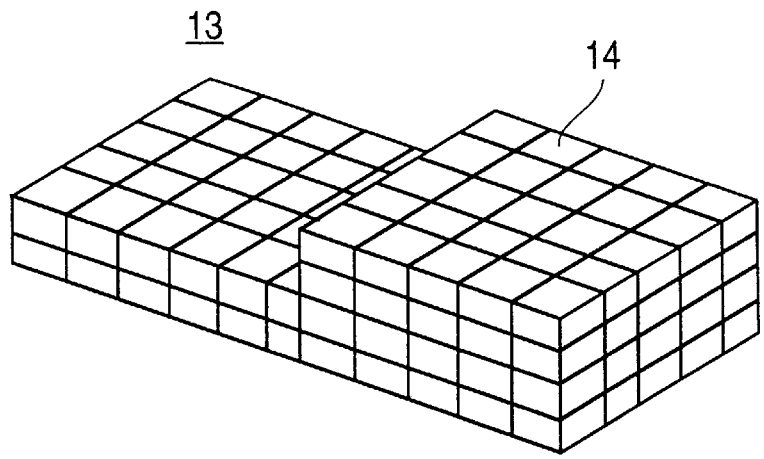
FIG. 6 is a drawing showing how the small elements of an object are decided as an example of the present invention.

This example is concerned with a molded product 13 with a step portion changing from 5 mm to 10 mm in thickness and which is divided into a plurality of small elements 14 as shown in FIG. 6.

At first, in Step 1 of FIG. 2, the injection molding conditions (nylon resin as the material to be used, 280° C. as the injection temperature, 80° C. as the mold temperature and 1 second as the fill time) were entered. Then, in Step 2, the shape of the injection molded product was divided into a plurality of three-dimensional small elements 14 so that a three-dimensional model of the product was constructed as shown in FIG. 6. In this example, the product was divided into regular lattice three-dimensional small elements shaped by hexahedrons with eight apexes for each.

In succession in Step 3 of FIG. 2, flow conductances κ were obtained from the equation (5) ($\kappa = aR/\eta + b$, a=0.4 mm, b=0.0 mm/(Pa·sec), η=100 Pa·sec). In the equation (5), the distance between the mold and the center of gravity of each element is represented by R.

Figure 7:
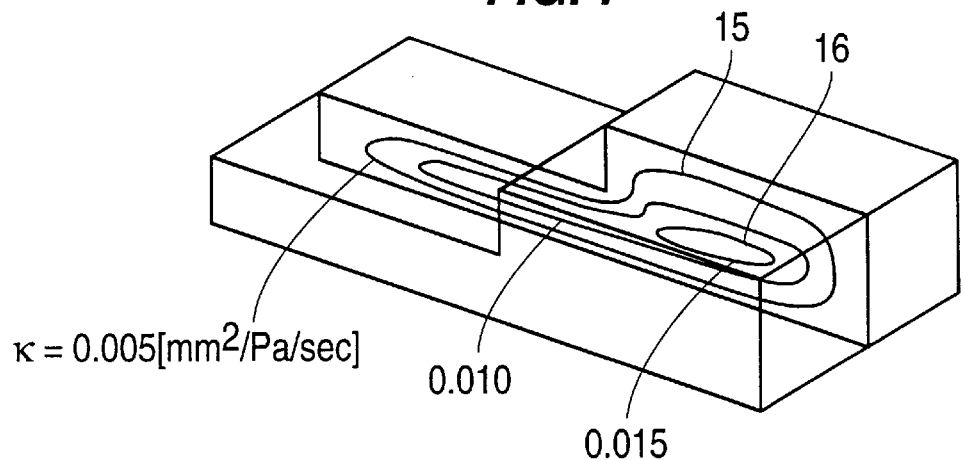
FIG. 7 is a drawing showing the results of computing the distribution of flow conductances κ at a cross section of an injection molded product in an example of the present invention.

FIG. 7 shows the distribution of the flow conductances κ in a section obtained based on the equation 5 using the small element model of FIG. 6, by contour lines. As can be seen from FIG. 7, at a portion 15 close to the mold surface, the flow conductance is close to zero, and on the other hand at a portion 16 close to the center of the thickness, the flow conductance is 0.02 mm/(Pa·sec), showing high flowability. It can be seen that the κ distribution obtained is smooth.

Figure 8:
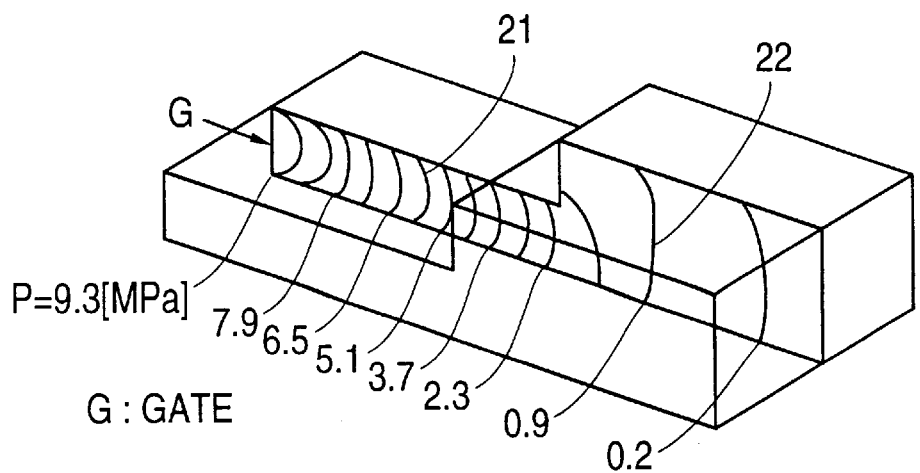
FIG. 8 is a contour line diagram showing the results of analyzing the pressure distribution inside an injection molded product based on the distribution of flow conductances κ of FIG. 7.

Subsequently, in Step 4 of FIG. 4, the pressure distribution of the respective small elements during injection molding was obtained by solving the equation (3) based on the κ distribution of FIG. 7 using a numerical calculation program similar to that for analyzing thermal conduction. Furthermore, in Step 5, these results were graphically processed, to obtain a pressure distribution as shown in FIG. 8. The pressure range of the pressure distribution which is indicated with pressure contour lines 21, 22 was 0.1 to 10 MPa. This diagram shows the pressures of the respective small elements by contour lines. The series of computation starting from Step 2 was completed in a very short time of about 90 seconds using an engineering work station.

Figure 9:
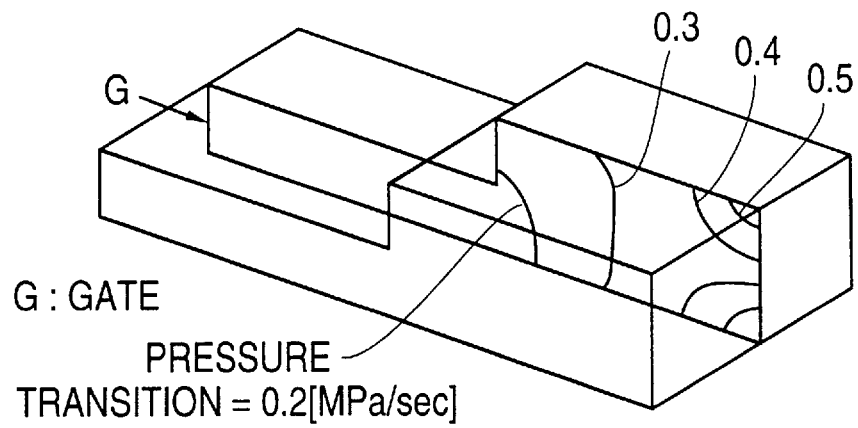
FIG. 9 is a contour line diagram showing the results of analyzing the distribution of pressure transitions inside an injection molded product based on the distribution of flow conductances κ of FIG. 7.
Figure 10:
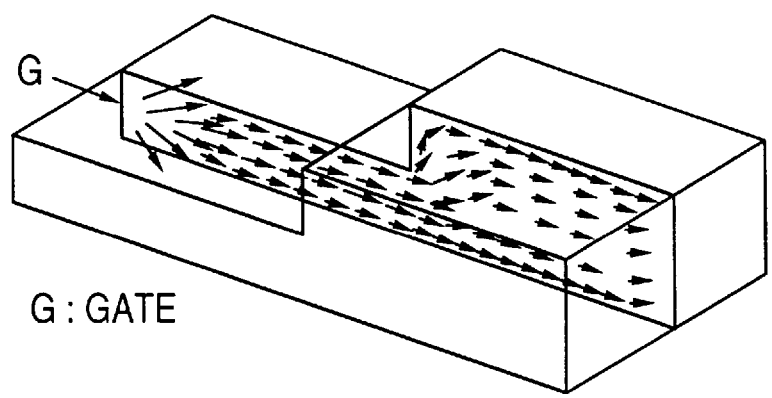
FIG. 10 is a diagram showing the results of analyzing the distribution of flow velocities of a material inside an injection molded product based on the distribution of flow conductances κ of FIG. 7.

Based on the pressure distribution obtained, the pressure transition distribution (FIG. 9) and the flow velocity distribution (FIG. 10) were obtained. Furthermore, the shear stress distribution, etc. were also obtained. According to these results obtained by analysis, the flow velocities are 30 to 100 mm/sec, and the shear stresses are 1000 Pa and less. Since it was judged that there was no particular problem for injection molding, the injection molded product was produced. The produced injection molded product was excellent in such properties as strength since it was produced under optimum conditions.

If any molding failure is likely to occur due to the occurrence of an extreme pressure gradient portion, and so on, the shape of the molded product, the molding conditions, the material, etc. can be changed, to repeat the same procedure from Step 1, for obtaining adequate product design, mold design, molding conditions, etc.

EXAMPLE 2

Figure 11:
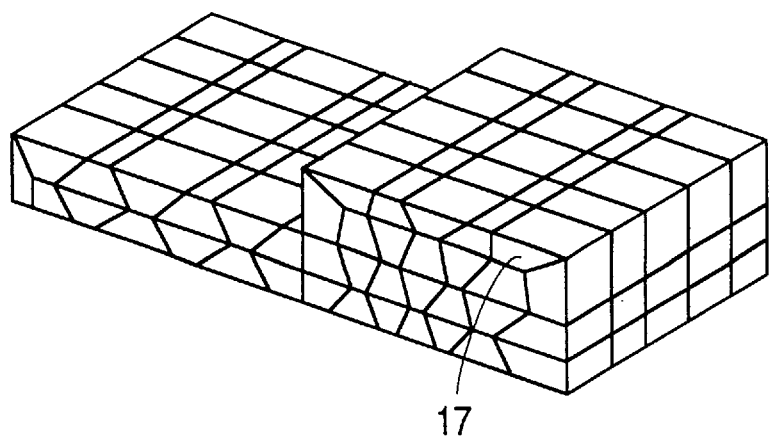
FIG. 11 shows how small elements of an object are decided as an example of the present invention.
Figure 12:
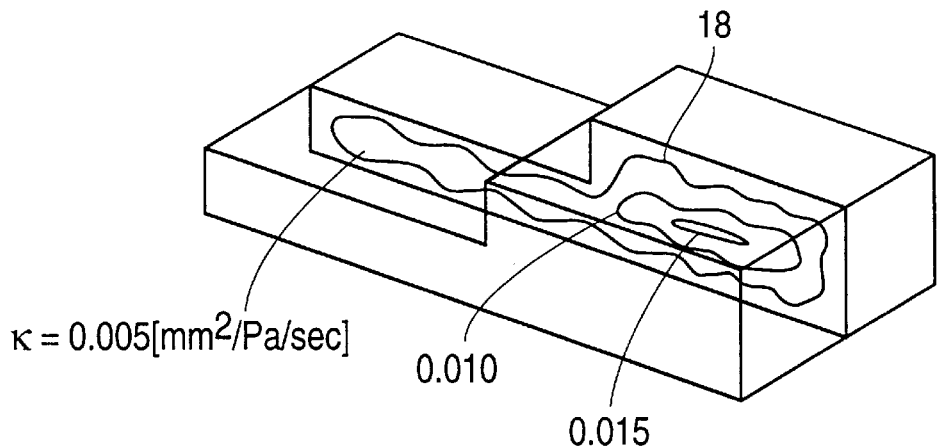
FIG. 12 is a drawing showing the results of computation to illustrate the distribution of flow conductances κ at a cross section of an injection molded product as an example of the present invention.

For the same injection molded product as that of Example 1, the distribution of flow conductances κ was obtained based on the equation (5) under the same conditions as above except that a model of irregularly divided small elements 17 as shown in Fig. 11 was used. As a result, the flow conductance κ shown with contour line 18 changed irregularly near the mold boundary as shown in FIG. 12. It can be seen that this result cannot be physically explained, and is a computation error. The reason is surmised to be that the distances between the centers of gravity of adjacent elements and the mold surface, which should be essentially almost the same, are not the same being affected by the small element division method.

In this case, it may be difficult to obtain accurate results by analysis. However, the model of irregularly divided small elements as described above can be automatically simply generated from the shape of an injection molded product, and obtaining the flow conductances κ based on the equation (5) is high in computational speed. So, the analysis as above can be effectively used for determining approximate conditions in the beginning to decide the injection molding conditions.

EXAMPLE 3

For the same injection molded product as that of Examples 1 and 2, the small element model shown in FIG. 11 as that of Example 2 was used to obtain the distribution of flow conductances κ based on the equation (7), and the distribution was used to analyze the injection molding process under the same conditions as in the above examples.

Figure 13:
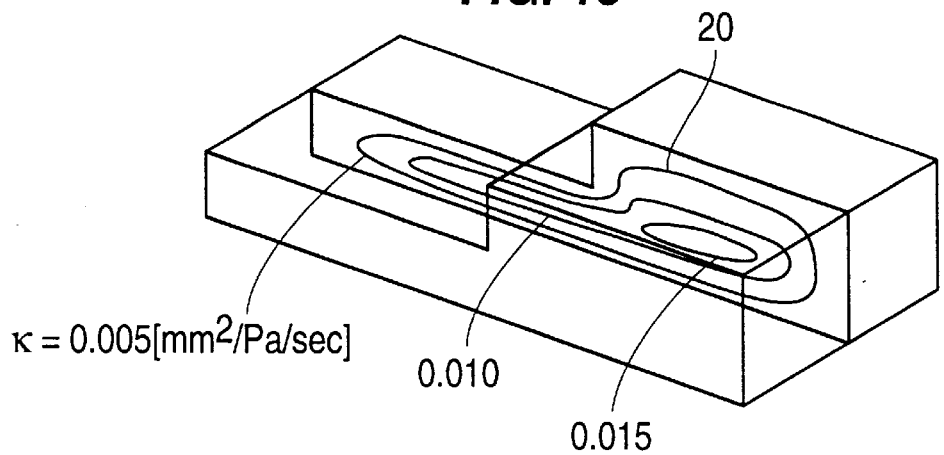
FIG. 13 is a drawing showing the results of computation to illustrate the distribution of flow conductances κ at a cross section of an injection molded product as an example of the present invention.

FIG. 13 shows the distribution of the flow conductances κ in a section obtained based on the equation (7) using the small element model of Fig. 11, as contour lines. Though the computing time was slightly longer, the κ distribution (distribution range: 0 to 0.02 mm$^2$/(Pa·sec)) obtained was smooth like that of FIG. 7.

Figure 14:
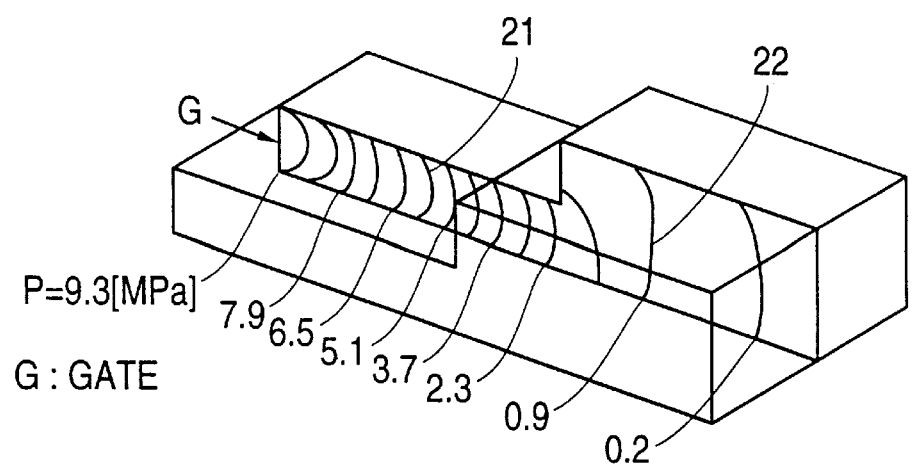
FIG. 14 is a contour line diagram showing the results of analyzing the pressure distribution inside an injection molded product based on the distribution of flow conductances κ of FIG. 13.

In succession in Step 4 of FIG. 2, based on the κ distribution shown with contour line 20 obtained in FIG. 13, the distribution of pressures of the respective small elements during injection molding was obtained as a 0.1 to 10 MPa pressure distribution shown with contour lines 21, 22 as shown in FIG. 14. Also in this case, the pressures of the respective small elements are expressed as contour lines. The pressure distribution obtained was almost the same as that shown in FIG. 8. The series of computation starting from Step 2 was completed in a rather longer time of about 160 seconds using the same engineering work station as above. If any conventional general numerical calculation method is used to obtain the pressure distribution for the same object, for example, it takes about 2500 seconds.

Figure 15:
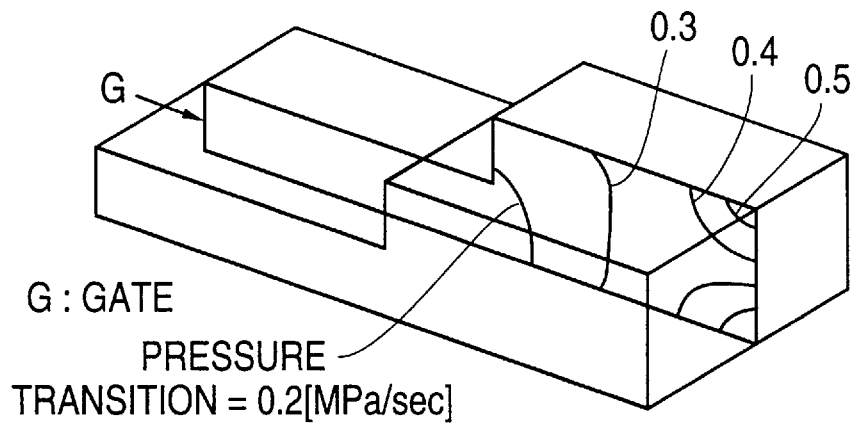
FIG. 15 is a contour line diagram showing the results of analyzing the distribution of pressure transitions inside an injection molded product based on the distribution of flow conductances κ of FIG. 13.
Figure 16:
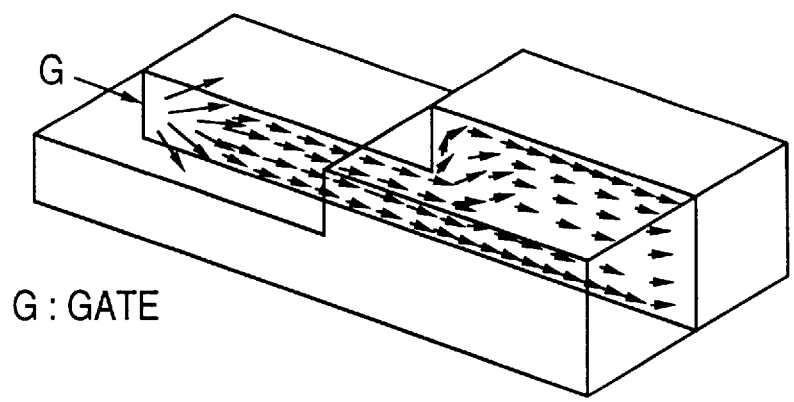
FIG. 16 is a diagram showing the results of analyzing the distribution of flow velocities of a material inside an injection molded product based on the distribution of flow conductances κ of FIG. 13.
Figure 17:
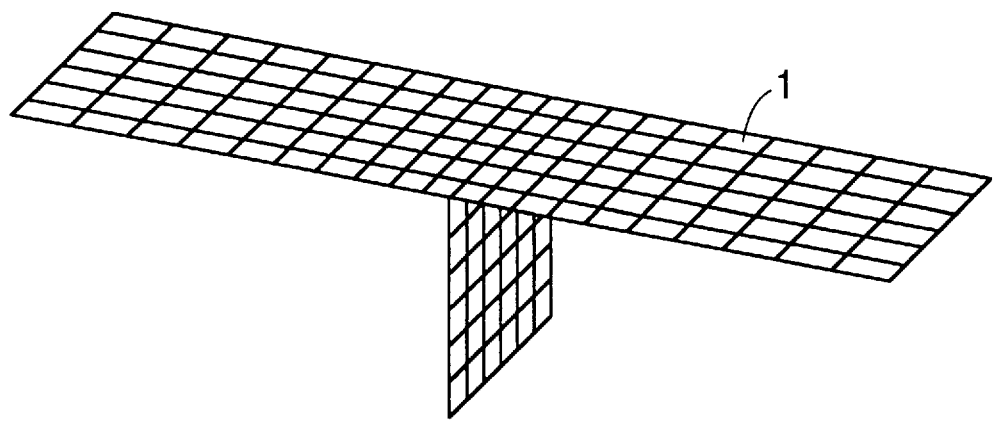
FIG. 17 is a drawing showing a two-dimensional model divided into small elements used in the conventional analysis of injection molding process.

Based on the pressure distribution obtained, the pressure transition distribution (FIG. 15) and the flow velocity distribution (FIG. 16) were obtained. Furthermore, the shear stress distribution, etc. were also obtained. These results were also almost the same as those in Example 1. From these results obtained by analysis, it was judged that there was no particular problem for injection molding. So, the injection molded product was produced. Since the injection molded product was produced under the optimum conditions similar to those of Example 1, the product was excellent in such properties as strength.

As in the case of Example 1, if a molding failure is likely to occur due to the occurrence of an extreme gradient portion, and so on, the shape of the molded product, the molding conditions, the material, etc. can be changed to repeat the same procedure from Step 1, for obtaining the appropriate product design, mold design, molding conditions, etc.

I claim:

1. An apparatus for analyzing a process of fluid flow comprising; a three-dimensional model constructing means for constructing a three-dimensional model divided into a plurality of small elements to represent at least a part of a cavity where fluid flows, a flow conductance determining means for determining the flow conductance κ of the fluid as a small value when the small element concerned is located close to the cavity wall surface and determining the flow conductance κ of the fluid as a large value when the small element is located far away, and a pressure computing means for finding the pressures of the fluid at said respective small elements based on said flow conductances κ.

2. An apparatus for analyzing a process of fluid flow comprising; a three-dimensional model constructing means for constructing a three-dimensional model divided into a plurality of small elements to represent at least a part of a cavity where fluid flows, a flow conductance determining means for determining the flow conductance κ of the fluid as a small value when the small element concerned is located close to the cavity wall surface and determining the flow conductance κ of the fluid as a large value when the small element is located far away, and a pressure transition computing means for finding the pressure transitions of the fluid at said respective small elements based on said flow conductances κ.

3. An apparatus for analyzing a process of fluid flow comprising; a three-dimensional model constructing means for constructing a three-dimensional model divided into a plurality of small elements to represent at least a part of a cavity where fluid flows, a flow conductance determining means for determining the flow conductance κ of the fluid as a small value when the small element concerned is located close to the cavity wall surface and determining the flow conductance κ of the fluid as a large value when the small element is located far away, and a flow velocity computing means for finding the flow velocities of the fluid at said respective small elements based on said flow conductances κ.

4. A method for analyzing a process of fluid flow comprising; constructing a three-dimensional model divided into a plurality of small elements to represent at least a part of a cavity where fluid flows, determining the flow conductances κ of the fluid at the respective small elements, finding the pressures of said fluid at said respective small elements based on said flow conductances κ determined, and analyzing the flow process of said fluid by said pressures found, wherein the flow conductance κ at each of said small elements is determined by a function F(R, η) which increases according to the increase of the minimum distance R between the small element and the cavity wall surface, and decreases according to the increase of the viscosity η of said fluid.

5. A method for analyzing a process of fluid flow comprising; constructing a three-dimensional model divided into a plurality of small elements to represent at least a part of a cavity where fluid flows, determining the flow conductances κ of the fluid at the respective small elements, finding the pressure transitions of said fluid at said respective small elements based on said flow conductances κ determined, and analyzing the flow process of said fluid by said pressure transitions found, wherein the flow conductance κ at each of said small elements is determined by a function F(R, η) which increases according to the increase of the minimum distance R between the small element and the cavity wall surface, and decreases according to the increase of the viscosity η of said fluid.

6. A method for analyzing a process of fluid flow comprising; constructing a three-dimensional model divided into a plurality of small elements to represent at least a part of a cavity where fluid flows, determining the flow conductances κ of the fluid at the respective small elements, finding the flow velocities of said fluid at said respective small elements based on said flow conductances κ determined, and analyzing the flow process of said fluid by said flow velocities found, herein the flow conductance κ at each of said small elements is determined by a function F(R, η) which increases according to the increase of the minimum distance R between the small element and the cavity wall surface, and decreases according to the increase of the viscosity η of said fluid.

7. A method for analyzing a process of fluid flow comprising; constructing a three-dimensional model divided into a plurality of small elements to represent at least a part of a cavity where fluid flows, determining the flow conductances κ of the fluid at the respective small elements, finding the pressures of said fluid at said respective small elements based on said flow conductances κ determined, and analyzing the flow process of said fluid by said pressures found, wherein the flow conductance κ at each of said small elements is determined by solving the following equation;

$$\frac{\partial^2 \kappa}{\partial x^2} + \frac{\partial^2 \kappa}{\partial y^2} + \frac{\partial^2 \kappa}{\partial z^2} = -\frac{1}{\eta},$$

where η is the viscosity of said material to be injection-molded; and x, y and z represent the position of said small element.

8. An apparatus for analyzing an injection molding process comprising; a three-dimensional model constructing means for constructing a three-dimensional model divided into a plurality of small elements to represent at least a part of an injection molded product, a flow conductance determining means for determining the flow conductance κ of the material to be injection-molded as a small value when the small element concerned is located close to the mold surface and determining the flow conductance κ of the material to be injection-molded as a large value when the small element is located far away, and a pressure computing means for finding the pressures of the material to be injection-molded at said respective small elements based on said flow conductances κ.

9. An apparatus for analyzing an injection molding process comprising; a three-dimensional model constructing means for constructing a three-dimensional model divided into a plurality of small elements to represent at least a part of an injection molded product, a flow conductance determining means for determining the flow conductance κ of the material to be injection-molded as a small value when the small element concerned is located close to the mold surface and determining the flow conductance κ of the material to be injection-molded as a large value when the small element is located far away, and a pressure transition computing means for finding the pressure transitions of the material to be injection-molded at said respective small elements based on said flow conductances κ.

10. An apparatus for analyzing an injection molding process comprising; a three-dimensional model constructing means for constructing a three-dimensional model divided into a plurality of small elements to represent at least a part of an injection molded product, a flow conductance determining means for determining the flow conductance κ of the material to be injection-molded as a small value when the small element concerned is located close to the mold surface and determining the flow conductance κ of the material to be injection-molded as a large value when the small element is located far away, and a flow velocity computing means for finding the flow velocities of the material to be injection-molded at said respective small elements based on said flow conductances κ.

11. A method for analyzing an injection molding process comprising; constructing a three-dimensional model divided into a plurality of small elements to represent at least a part of an injection molded product, determining the flow conductances κ of the material to be injection-molded at the respective small elements, finding the pressures of the material to be injection-molded at said respective small elements based on said flow conductances κ determined, and analyzing the injection molding process of the injection molded product, by said pressures found, wherein the flow conductance κ at each of said small elements is determined by a function F(R, η) which increases according to the increase of the minimum distance R between the small element and the mold surface, and decreases according to the increase of the viscosity η of said material to be injection-molded.

12. A method for analyzing an injection molding process comprising;
constructing a three-dimensional model divided into a plurality of small elements to represent at least a part of an injection molded product, determining the flow conductances κ of the material to be injection-molded at the respective small elements, finding the pressure transitions of the material to be injection-molded at said respective small elements based on said flow conductances κ determined, and analyzing the injection molding process of the injection molded product, by said pressure transitions found, wherein the flow conductance κ at each of said small elements is determined by a function F(R, η) which increases according to the increase of the minimum distance R between the small element and the mold surface, and decreases according to the increase of the viscosity η of said material to be injection-molded.

13. A method for analyzing an injection molding process comprising;
constructing a three-dimensional model divided into a plurality of small elements to represent at least a part of an injection molded product, determining the flow conductances κ of the material to be injection-molded at the respective small elements, finding the flow velocities of the material to be injection-molded at said respective small elements based on said flow conductances κ determined, and analyzing the injection molding process of the injection molded product, by said flow velocities found, wherein the flow conductance κ at each of said small elements is determined by a function F(R, η) which increases according to the increase of the minimum distance R between the small element and the mold surface, and decreases according to the increase of the viscosity η of said material to be injection-molded.

14. A method for analyzing a process of fluid flow comprising; constructing a three-dimensional model divided into a plurality of small elements to represent at least a part of a cavity where fluid flows, determining the flow conductances κ of the fluid at the respective small elements, finding the pressure transitions of said fluid at said respective small elements based on said flow conductances κ determined, and analyzing the flow process of said fluid by said pressure transitions found, wherein the flow conductance κ at each of said small elements is determined by solving the following equation;

$$\frac{\partial^2 \kappa}{\partial x^2} + \frac{\partial^2 \kappa}{\partial y^2} + \frac{\partial^2 \kappa}{\partial z^2} = -\frac{1}{\eta},$$

where η is the viscosity of said material to be injection-molded; and x, y and z represent the position of said small element.

15. A method for producing an injection molded product comprising; determining the molding conditions of an injection molded product, constructing a three-dimensional model divided into a plurality of small elements to represent at least a part of said injection molded product, determining the flow conductance κ of the material to be injection-molded as a small value when the small element concerned is located close to the mold surface while determining the flow conductance κ of the material to be injection-molded as a large value when the small element is located far away, finding the pressures of said material to be injection-molded at the respective small elements based on the flow corductances κ determined, finally deciding molding conditions based on the distribution of the pressures thus found, and producing the injection molded product based on said finally decided molding conditions.

16. A method for producing an injection molded product comprising; determining the molding conditions of an injection molded product, constructing a three-dimensional model divided into a plurality of small elements to represent at least a part of said injection molded product, determining the flow conductance κ of the material to be injection-molded as a small value when the small element concerned is located close to the mold surface while determining the flow conductance κ of the material to be injection-molded as a large value when the small element is located far away, finding the pressure transitions of said material to be injection-molded at the respective small elements based on the flow conductances κ determined, finally deciding molding conditions based on the distribution of the pressure transitions thus found, and producing the injection molded product based on said finally decided molding conditions.

17. A method for producing an injection molded product comprising; determining the molding conditions of an injection molded product, constructing a three-dimensional model divided into a plurality of small elements to represent at least a part of said injection molded product, determining the flow conductance κ of the material to be injection-molded as a small value when the small element concerned is located close to the mold surface while determining the flow conductance κ of the material to be injection-molded as a large value when the small element is located far away, finding the distribution of flow velocities of said material to be injection-molded at the respective small elements based on the flow conductances κ determined, finally deciding molding conditions based on the distribution of flow velocities thus found, and producing the injection molded product based on said finally decided molding conditions.

18. A method of any one of claims 15 through 17, wherein said molding conditions include any one of the shape of said injection molded product, mold configuration, injection speed, material temperature, mold temperature and injection molded material.

19. An injection molded product produced by any one of the method for producing an injection molded product of claims 15 through 18.

20. A method for analyzing a process of fluid flow comprising; constructing a three-dimensional model divided into a plurality of small elements to represent at least a part of a cavity where fluid flows, determining the flow conductances κ of the fluid at the respective small elements, finding the flow velocities of said fluid at said respective small elements based on said flow conductances κ determined, and analyzing the flow process of said fluid by said flow velocities found, wherein the flow conductance κ at each of said small elements is determined by solving the following equation;

$$\frac{\partial^2 \kappa}{\partial x^2} + \frac{\partial^2 \kappa}{\partial y^2} + \frac{\partial^2 \kappa}{\partial z^2} = -\frac{1}{\eta},$$

where η is the viscosity of said material to be injection-molded; and x, y and z represent the position of said small element.

21. A method for analyzing an injection molding process comprising; constructing a three-dimensional model divided into a plurality of small elements to represent at least a part of an injection molded product, determining the flow conductances κ of the material to be injection-molded at the respective small elements, finding the pressures of the material to be injection-molded at said respective small elements based on said flow conductances κ determined, and analyzing the injection molding process of the injection molded product, by said pressures found, wherein the flow conductance κ at each of said small elements is determined by solving the following equation;

$$\frac{\partial^2 \kappa}{\partial x^2} + \frac{\partial^2 \kappa}{\partial y^2} + \frac{\partial^2 \kappa}{\partial z^2} = -\frac{1}{\eta},$$

where η is the viscosity of said material to be injection-molded; and x, y and z represent the position of said small element.

22. A method for analyzing an injection molding process comprising; constructing a three-dimensional model divided into a plurality of small elements to represent at least a part of an injection molded product, determining the flow conductances κ of the material to be injection-molded at the respective small elements, finding the pressure transitions of the material to be injection-molded at said respective small elements based on said flow conductances κ determined, and analyzing the injection molding process of the injection molded product, by said pressure transitions found, wherein the flow conductance κ at each of said small elements is determined by solving the following, equation;

$$\frac{\partial^2 \kappa}{\partial x^2} + \frac{\partial^2 \kappa}{\partial y^2} + \frac{\partial^2 \kappa}{\partial z^2} = -\frac{1}{\eta},$$

where η is the viscosity of said material to be injection-molded; and x, y and z represent the position of said small element.

23. A method for analyzing an injection molding process comprising; constructing a three-dimensional model divided into a plurality of small elements to represent at least a part of an injection molded product, determining the flow conductances κ of the material to be injection-molded at the respective small elements, finding the flow velocities of the material to be injection-molded at said respective small elements based on said flow conductances κ determined, and analyzing the injection molding process of the injection molded product, by said flow velocities found, wherein the flow conductance κ at each of said small elements is determined by solving the following equation;

$$\frac{\partial^2 \kappa}{\partial x^2} + \frac{\partial^2 \kappa}{\partial y^2} + \frac{\partial^2 \kappa}{\partial z^2} = -\frac{1}{\eta},$$

where η is the viscosity of said material to be injection-molded; and x, y and z represent the position of said small element.

* * * * *